March 3, 1953 C. H. WIEGMAN ET AL 2,630,537

PORTABLE ENGINE-GENERATOR SET

Filed Feb. 13, 1951 6 Sheets-Sheet 1

INVENTORS,
CLARENCE H. WIEGMAN.
DUDLEY S. KING.
AUGUST W. RICKENBACK.
FREDERIC G. ROHM.

BY Alden D. Redfield
ATTORNEY.

March 3, 1953 C. H. WIEGMAN ET AL 2,630,537

PORTABLE ENGINE-GENERATOR SET

Filed Feb. 13, 1951 6 Sheets-Sheet 2

INVENTORS.
CLARENCE H. WIEGMAN.
DUDLEY S. KING.
AUGUST W. RICKENBACK.
FREDERIC G. ROHM.
BY
Alden D. Redfield
ATTORNEY.

March 3, 1953 C. H. WIEGMAN ET AL 2,630,537

PORTABLE ENGINE-GENERATOR SET

Filed Feb. 13, 1951 6 Sheets-Sheet 3

INVENTORS.
CLARENCE H. WIEGMAN.
DUDLEY S. KING.
AUGUST W. RICKENBACK.
FREDERIC G. ROHM.

BY

Alden D. Redfield
ATTORNEY.

March 3, 1953 C. H. WIEGMAN ET AL 2,630,537

PORTABLE ENGINE-GENERATOR SET

Filed Feb. 13, 1951 6 Sheets-Sheet 4

INVENTORS.
CLARENCE H. WIEGMAN.
DUDLEY S. KING.
AUGUST W. RICKENBACH.
FREDERIC G. ROHM.

BY
Alden D. Redfield
ATTORNEY.

March 3, 1953 C. H. WIEGMAN ET AL 2,630,537

PORTABLE ENGINE-GENERATOR SET

Filed Feb. 13, 1951 6 Sheets-Sheet 5

INVENTORS.
CLARENCE H. WIEGMAN.
DUDLEY S. KING.
AUGUST W. RICKENBACK.
FREDERIC G. ROHM.

BY Alden D. Redfield
ATTORNEY.

PORTABLE ENGINE-GENERATOR SET

Filed Feb. 13, 1951 6 Sheets-Sheet 6

INVENTORS.
CLARENCE H. WIEGMAN.
DUDLEY S. KING.
AUGUST W. RICKENBACK.
FREDERIC G. ROHM.
BY
Alden D. Redfield
ATTORNEY.

Patented Mar. 3, 1953 2,630,537

UNITED STATES PATENT OFFICE 2,630,537

PORTABLE ENGINE-GENERATOR SET

Clarence H. Wiegman, Dudley S. King, and August W. Rickenbach, Williamsport, and Frederic G. Rohm, Montoursville, Pa., assignors to Avco Manufacturing Corporation, Cincinnati, Ohio, a corporation of Delaware Application February 13, 1951, Serial No. 210,662

15 Claims. (Cl. 290—1)

The present invention relates to engine-generator sets and has more particular reference to a portable set intended for use as a source of electrical power for starting aircraft engines and energizing other appliances.

With the very great expansion of our armed forces, use of aircraft has become prevalent in all parts of the world under a wide variety of climatic conditions. This diversified use has created many new problems, certain of which have been solved through mere adaptions of formerly used commercial equipment. Other problems, such as those to which the present invention pertains, have been met by novel equipment having no exact parallel among that previously used.

There has been a particularly great need for portable engine-generator sets for producing electrical energy for starting jet aircraft engines and for energizing other types of equipment found in and around airplanes. An exacting requirement of such equipment, as supplied to the armed forces, is that it be adapted for use under all types of climatic conditions embracing temperatures ranging from minus 65 degrees Fahrenheit to plus 130 degrees Fahrenheit. Such extreme ambient conditions necessitate special designs to make possible use of the same piece of equipment under all possible conditions without modification or adjustment.

The present invention contemplates provision of a portable engine-generator set incorporating a wheeled chassis on which is secured an air-cooled engine operatively connected to a plurality of electrical generators through suitable transmission gearing. The engine, generators, and other operating components are housed within a body which is internally divided into compartments by a transverse bulkhead, disposed approximately in the plane of the transmission. The transmission includes a rotary fan which creates a moving stream of cooling air from the generator side of the bulkhead to the engine side of the bulkhead.

Admission of ambient air to the generator compartment is controlled by a thermostatically actuated louver. A similar louver is also provided in the engine compartment which, when opened, permits the egress of spent cooling air from the engine compartment.

An important feature of the structural organization taught by the present invention is that the engine compartment is pressurized slightly by the transmission fan. This compartment is used as a plenum chamber from which the compressed air is supplied to various components which require special cooling or air circulation.

From the foregoing it will be apparent that a principal object of the present invention is the provision of a portable engine-generator set which is completely self-sufficient and which is constructed and arranged for proper cooling of its components regardless of prevailing ambient conditions.

Another important object of the present invention is the provision of thermostatically controlled louvers which, with a minimum of mechanism, automatically maintain within the engine-generator set temperature conditions conducive to proper operation.

A still further object of the present invention is the provision of supplementary throttle-operated air control means in the engine compartment which is instrumental in establishing within the engine compartment proper temperature conditions when the set is used under extremely hot operating conditions.

Another object of the structure taught by the present invention is the provision of means for preventing excessive heat radiation from the exhaust pipes associated with the engine which powers the set.

It is also an advantage of the present invention that its structural arrangement makes possible the scavenging of batteries which are provided in the set for starting purposes. Another advantage of the present arrangement is that it facilitates cooling the walls adjacent to the engine muffler thereby precluding injury to the engine-generator structural elements and operating personnel.

A particularly important object of the present invention is that it is constructed and arranged to permit regulation of the engine carburetor air so that its temperature may be maintained at all times within predetermined limits.

Another advantage of the present invention is that it provides a completely self-sufficient portable engine-generator set which is very compact and light in weight, thus making possible use of such sets as the source of electric energy in large size aircraft.

A still further advantage of the invention is that it permits accessibility of all components.

The novel features that are considered characteristic of the invention are set fouth in the appended claims; the invention itself, however, both as to its organization and method of operation, together with additional objects and advantages thereof, will best be understood from the following description of a specific embodiment when read in conjunction with the accompanying drawings, in which:

*General arrangement*

Figure 1:
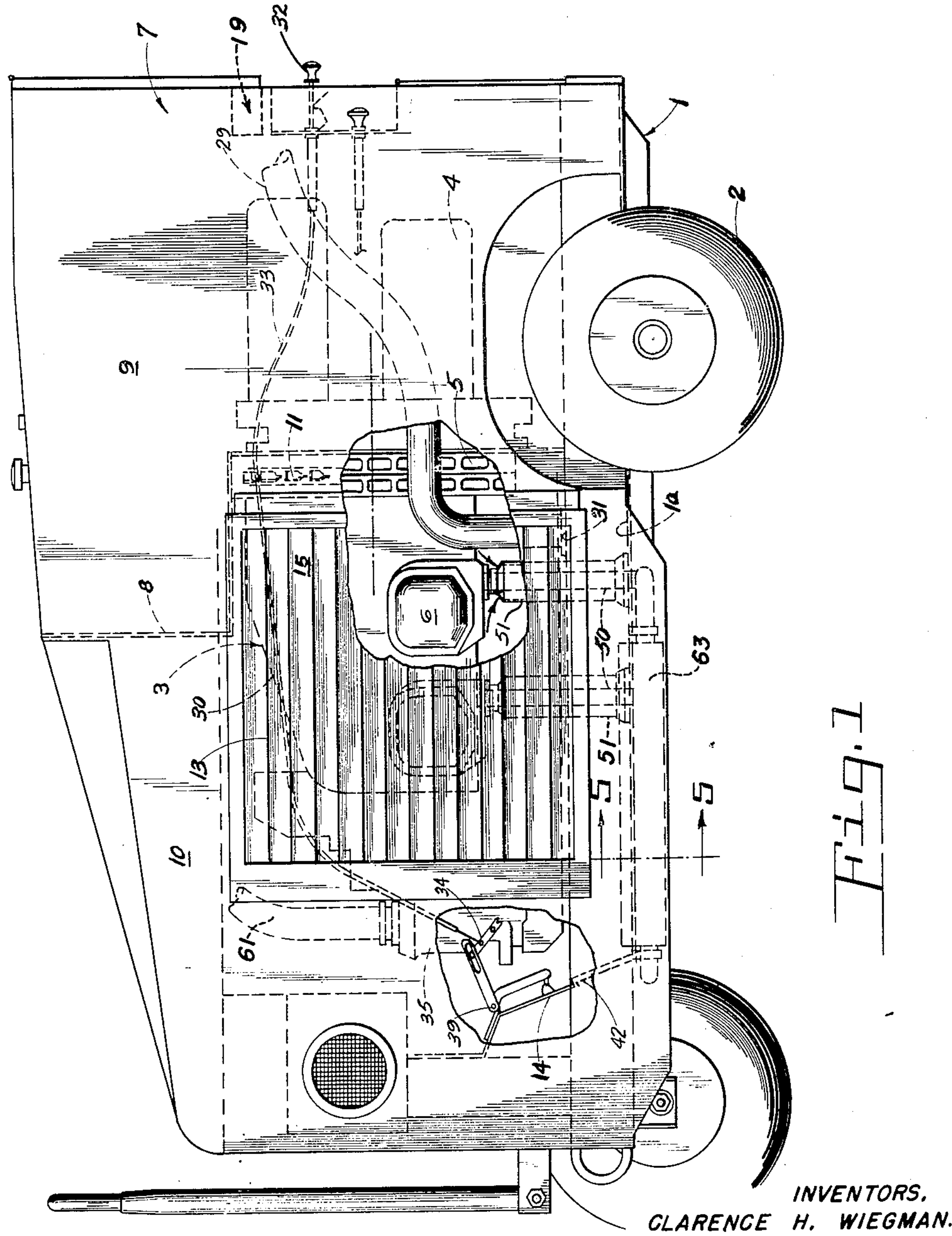
Fig. 1 is an elevational side view of a portable engine-generator set, parts of the side wall of the body being broken away to facilitate illustration of the internal construction thereof.
Figure 2:
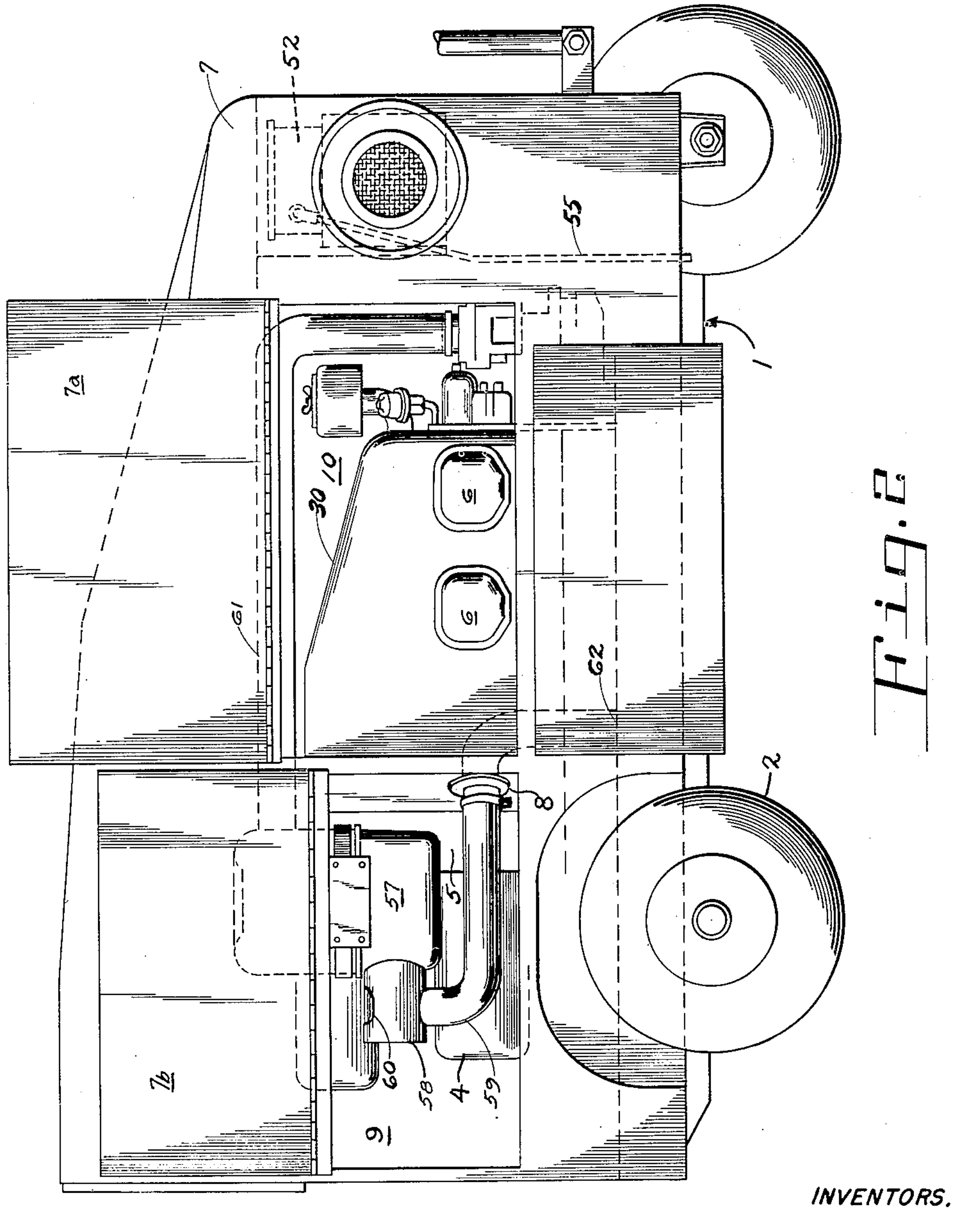
Fig. 2 is an elevational side view of the set showing the side opposite that shown in Fig. 1, access doors provided in the body being shown in their open positions.

With particular reference to Figs. 1 and 2 the engine-generator set of the present invention incorporates a chassis, generally designated 1, to which is attached ground wheels 2 and on which is supported an engine, generally designated 3, which drives a plurality of electric generators 4 through a transmission 5.

The engine employed in the present invention may be any internal combustion engine but preferably is an air cooled engine of the horizontal opposed type having a plurality of finned cylinders the ends of which are schematically indicated at 6.

A body, generally designated 7, cooperating with a continuous floor panel 1*a*, encloses the engine generator set and is internally divided by a transverse bulkhead 8 positioned in part in the vertical plane of the transmission 5 (Fig. 1). This bulkhead divides the interior of the set into a generator compartment 9 and an engine compartment 10. Air flow is induced from the generator compartment to the engine compartment by a rotary fan 11 which is a component of and driven by transmission 5. This fan is driven whenever the set is in use and pressurizes engine compartment 10 to a slight extent.

Under certain operating conditions, as will be described more fully hereinafter, ambient air is admitted to the generator compartment through a louver 12 provided at one end of the set (see Fig. 3). Another louver 13 is provided in a side wall of the set as indicated in Fig. 1 and permits, under certain operating conditions, egress of spent cooling air from engine compartment 10. Under particularly high temperature conditions, cooling air may also leave the engine compartment through supplementary control doors 14, indicated in Fig. 1 and shown more fully in detail in Figs. 7 and 8.

Each louver comprises a plurality of horizontally disposed movable slots 15 (see Fig. 6) which are provided at their ends with mounting ears 16 pivotally attached at 17 to stationary frame 17*a* of the louver. The ears are also pivotally attached to a control rod 18 at one side of the assembly, which rod is vertically movable under the control of a thermostat, generally designated 19. The thermostat incorporates a sealed bellows 20 secured at one end to a stationary housing 21 and having attached to the other end a projecting stud 22, pivotally attached to the mid point of a link 23. This link is pivotally attached at one end to a stationary bracket 24 and at its opposite end to an adjustable control rod 25 which is attached at its lower end to a plate 26 projecting from control rod 18.

As bellows 20 expands in response to an increase in temperature, stud 22 is forced downwardly and, through link 23 and rod 25, forces control rod 18 downwardly to rotate slats 15 about pivots 17, thereby opening the louver to permit air flow. A spring 27 is provided to close the louver as the bellows contracts in response to a decrease of temperature. This spring is shown attached at its upper end to stationary bracket 28 and at its lower end is attached to an extension of rod 18 (not shown).

Figure 6:
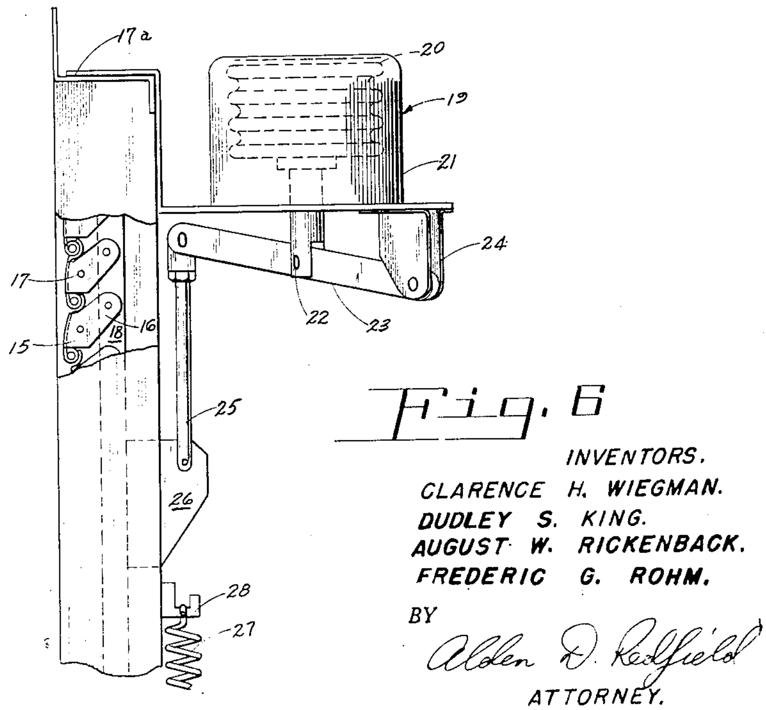
Fig. 6 is an elevational view with parts broken away showing the thermostat for controlling a louver.

Thermostatic control elements similar to those shown in Fig. 6 are provided on both of the louvers 12 and 13. The bellows of the thermostat associated with louver 13 is subjected to the spent cooling air within engine compartment 10 and operates the louver whenever the air temperature exceeds a value of 85 degrees Fahrenheit.

Figure 3:
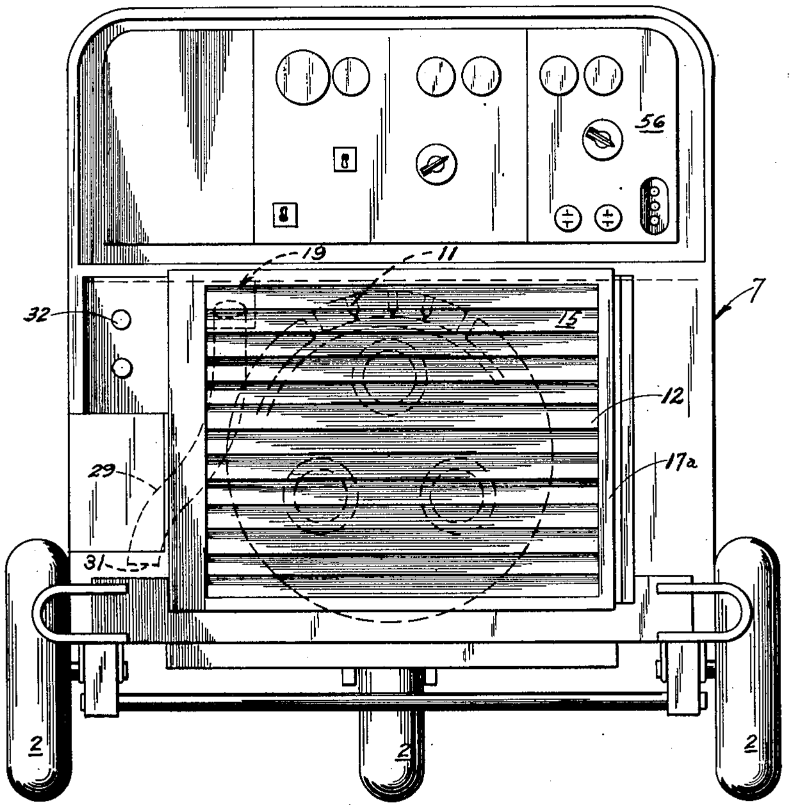
Fig. 3 is an elevational end view of the set showing the electric control unit for the generators and louver which admits air to the generator compartment.
Figure 4:
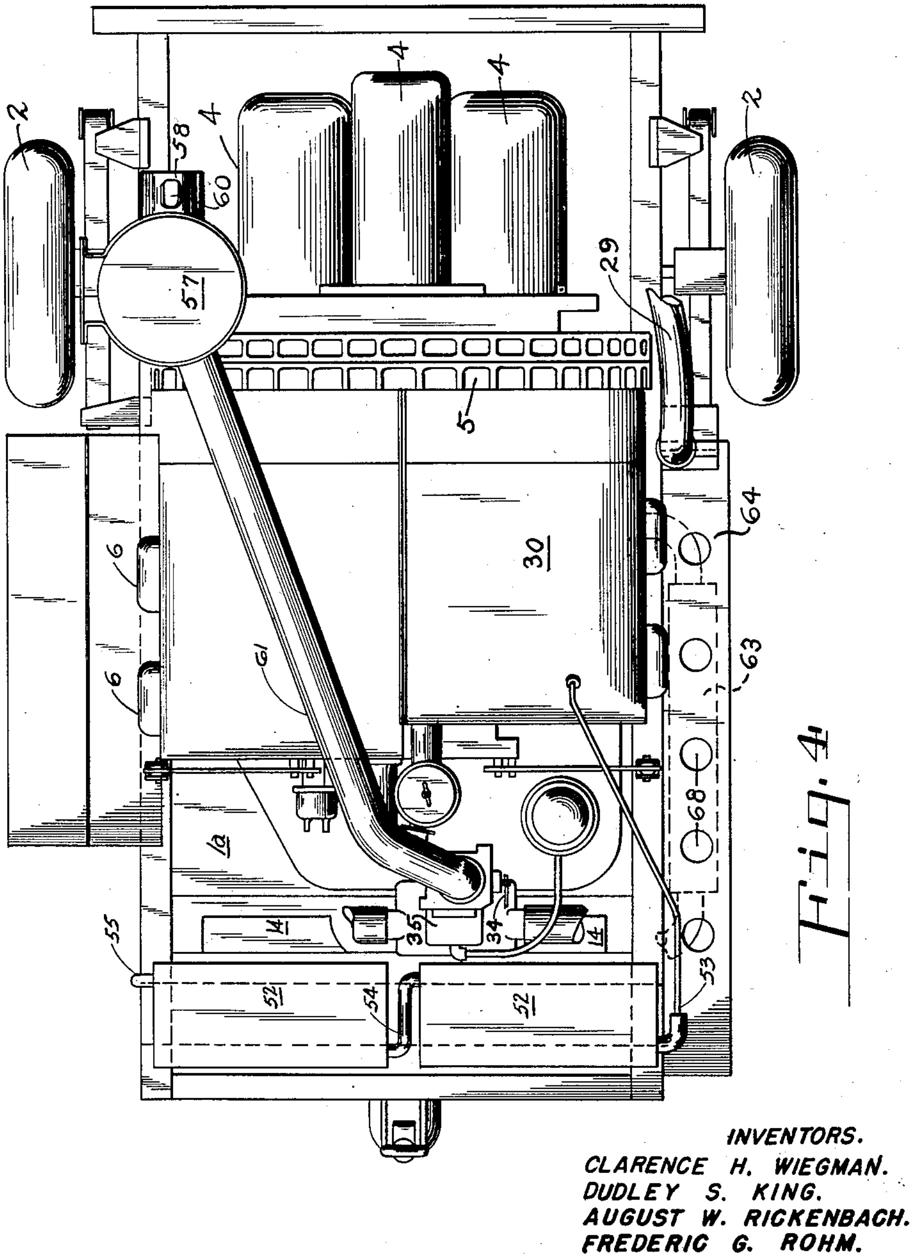
Fig. 4 is a top plan view of the set with the body removed.

Although physically located within generator compartment 9, the thermostatic control elements of louver 12 are responsive, not to the temperature within the generator compartment 9, but to the temperature of an air stream directed against the thermostat by a hose 29 which extends from the engine compartment through bulkhead 8 to the thermostat (see Figs. 1 and 3). Air flows through hose 29 as a result of the pressure head within the engine compartment. During operation, engine 3 generates considerable heat which must be carried away by the air stream created by fan 11. This air stream is directed over the exterior surfaces of the engine by a sheet metal baffle 30 (Figs. 1, 2, and 4) adjacent the fan, a large proportion of the cooling air passing downwardly over the engine cylinders. As a result, the spent cooling air surrounding the open lower end 31 of hose 29 is at a relatively elevated temperature with the result that the air transferred through the hose to the thermostat of intake louver 12 is similarly at a relatively high temperature.

When the set is first put into operation, the interior of the set is usually at a relatively low or moderate temperature with the result that both louvers 12 and 13 are fully closed and prevent any significant amount of air flow. Under such conditions, fan 11 merely pressurizes compartment 10. As the set continues to operate, heat is generated within the engine compartment and when the air temperature therein attains a value of approximately 85 degrees Fahrenheit the thermostat of louver 13 opens the louver permitting a very limited air flow determined by the amount of leakage of air past louver 12 and through other openings in the generator end of the body 7.

Continued operation of the set gradually raises the temperature of the air being fed by hose 29 to the thermostat of louver 12 to a value of approximately 65 degrees Fahrenheit at which temperature this louver is opened to permit air flow through louver 12 and the engine generator set and out of louver 13.

It is noteworthy that louvers 12 and 13 are spaced apart sufficiently to prevent recirculation of the cooling air thus making possible temperature equilibrium within the engine-generator set under fixed operating conditions. Under extremely cold conditions neither louver may be opened for a considerable time period after beginning operation. Under such conditions sufficient heat is eventually generated in the engine compartment to partially open louver 13. As the temperature of the air being supplied to the thermostat of louver 12 rises, it may open slightly to admit cold ambient air to the interior of the set. At abnormally low temperatures, this small air flow may drop the temperature sufficiently to cause louver 12 to close again. Thus, louver 12 may open and close a number of times while the set warms up until the interior attains a sufficient temperature to maintain both louvers constantly in their open positions. It has been found in practice that during this warming up period louver 13, once opened, usually stays open.

*Supplementary air control doors*

Figure 7:
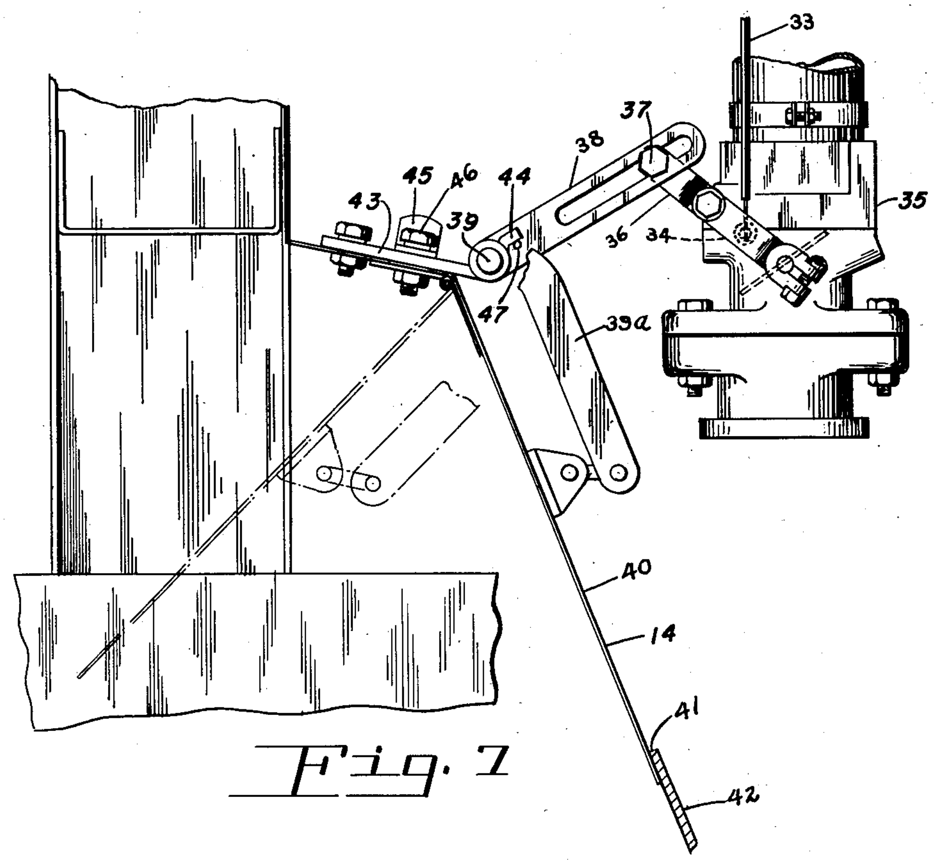
Fig. 7 is an elevational view partly in section showing the details of supplementary air control doors located in the engine compartment.
Figure 8:
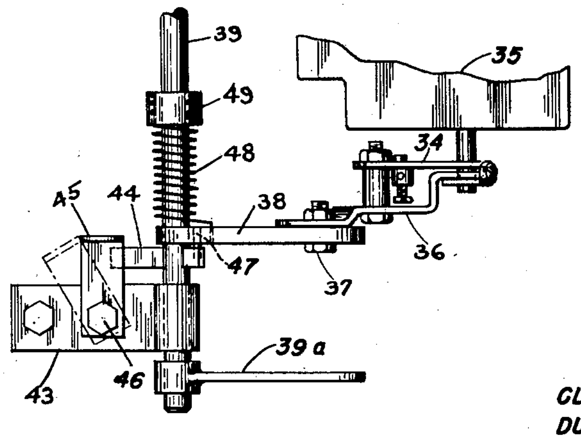
Fig. 8 is a plan view of the linkage for controlling the doors illustrated in Fig. 7.

Under extremely hot ambient conditions it has been found that the openings provided by louvers 12 and 13 are insufficient to maintain satisfactory temperature conditions within the engine compartment. To rectify this condition supplementary air control doors 14 (Figs. 4 and 7) are provided under the control of engine throttle 32, to which is attached an extensible cable 33 controlling the throttle valve arm 34 of the engine carburetor 35. With particular reference to Figs. 7 and 8, it will be noted that an extension 36 is attached to the throttle arm and carries at its distal end a shoulder bolt 37 which slidably engages a slotted actuating link 38. This arm is pivotally disposed about a transverse shaft 39. To this shaft are secured for conjoint rotation arms 39a which are operatively connected to supplementary doors 40 hingedly secured adjacent openings 41 in inclined floor 42 of the set.

A pair of bearing brackets 43 are rigidly secured to a portion of the floor adjacent openings 41 and rotatably support shaft 39. An actuating and lock tab 44 is secured to shaft 39 adjacent one of the bearing brackets and lies in the plane of the brackets when the doors are securely closed against floor 42. When thus positioned, the doors may be manually locked closed by a latch 45 pivoted about shoulder bolt 46.

During operation in extremely hot climates latch member 45 is disengaged from tab 44 with the result that the doors are permitted to open under the control of the carburetor throttle arm 34. The throttle arm is swung counterclockwise from its full-line position of Fig. 7 when the carburetor throttle is opened by movement of extensible cable 33. Slotted link 38 is correspondingly moved clockwise under the influence of shoulder bolt 37 and permits pin 47 projecting from link 38 to move out of engagement with tab 44. Simultaneously movement of link 38 tensions torsion spring 48, one end of which engages the link and the other end of which is anchored to shaft 39 by collar 49. Such tensioning of spring 48 produces a torque on shaft 39 which opens supplementary doors 40. Additional movement of the throttle arm toward the open throttle position allows the doors 40 to open correspondingly. The open position of the doors is limited for each throttle position by the engagement of pin 47 against tab 44.

When the engine generator set is to be shut down, the throttle arm is moved clockwise toward its closed position shown in full lines in Fig. 7. Such movement of the throttle arm causes counterclockwise movement of link 38 with the result that pin 47, bearing against tab 44, pulls the doors closed.

When the doors are in their closed position, latch member 45 may be moved into locking position above tab 44 (Figs. 7 and 8), thereby preventing opening of the doors when the carburetor throttle is operated. Use of such an arrangement makes possible use of the supplementary doors during operation of the set under extremely hot ambient conditions. Should it be desired to use the set under cold ambient conditions, the doors are locked closed by latch member 45 which, although preventing opening of supplementary doors 40, does not prevent normal operation of the carburetor throttle arm 34.

It is noteworthy that doors 40 are automatically held closed whenever the engine-generator set is not in operation. This is a particular advantage since it is desirable to have these doors shut when the set is not in use so that it is effectively sealed against the elements.

*Exhaust pipe cooling*

The present invention makes possible cooling of the exhaust pipes 50 through which the products of combustion leave engine cylinders 6. Whenever an internal combustion engine is enclosed as in the present invention, there is always danger of excessive heat radiation from the exhaust pipes. The present invention has rectified this condition through the provision of concentric tubular exhaust pipe shields 51 (Fig. 1) which are positioned about each exhaust pipe and permit flow of compressed cooling air from the interior of engine compartment 10 to the atmosphere surrounding the set. In other words, the exhaust pipe shields, being concentrically positioned about the exhaust pipes and larger in diameter than these pipes, create annular flow channels through which the air may flow from the engine compartment down through the floor of the engine-generator set as indicated diagrammatically in Fig. 1.

*Battery scavenging*

It is necessary to provide batteries in portable electric generator sets so that the engine may be started. For this reason batteries 52 are provided at one end of the set (see Fig. 4). These batteries are standard commercial units such as lead storage cells, and include air spaces above the electrolyte through which a flow of air may be established to carry off explosive, noxious and corrosive fumes produced during the charging of the batteries.

A feature of the present invention is the provision of an air line 53 (Fig. 4) communicating with the interior of engine baffle 30. Compressed cooling air from fan 11 may flow through air line 53 to one end of the first battery, through this battery to an interconnecting air line 54 by which the air is conducted to the second battery. After passing through the second battery, the air is conducted to the exterior of the set by another air line 55 (Fig. 2). In this way all fumes generated within the batteries are scavenged and directed to the surrounding atmosphere.

If desired, other air lines (not shown) may be attached to the engine baffle for directing cooling air to the interior of the electric control unit 56 which is provided for regulating the output of generators 4.

*Carburetor air temperature regulation*

An important aspect of the present invention is the provision of a temperature regulated air supply for carburetor 35 of engine 3. It will be appreciated by those skilled in the art that this is of great importance and absolutely necessary where the engine is to be used under a great range of ambient temperature conditions. It is also necessary for successful engine operation that the air supply to the carburetor be completely filtered to prevent the ingress of foreign matter which would be deleterious to the engine. To accomplish these objectives, an air filter 57 (Fig. 2) is provided in the generator compartment and has secured to one side thereof a thermostatic air regulating valve 58 to which hot air is supplied through hose 59. Relatively cool air from the generator compartment is also supplied to the regulating valve through port 60. The hot and cool air are mixed in predetermined proportions by the mixing valve and the mixture is supplied to the filter 57 from which it flows by hose 61 to the inlet of the carburetor in the engine compartment.

Successful operation of the carburetor air system is insured by mounting the filter in the relatively cool generator compartment. In this way undesirable heat transfer to the filter and the carburetor air passing therethrough is prevented. The hot air supply for the regulating valve is drawn from hose 59 which passes through bulkhead 8 and has its open end 62 (Fig. 2) near the floor of the engine generator set. This location of end 62 favors the ingress of hot spent cooling air as it leaves the engine cylinders.

The details of the thermostatic regulating valve have been described fully in application Serial Number 193,403 filed on November 1, 1950 by August W. Rickenbach.

*Muffler cooling*

The present invention employs a unique arrangement for cooling the surrounding walls adjacent muffler 63 (Fig. 5) to which is directed the exhaust gases from exhaust pipes 50. Under hot ambient conditions this muffler mounted beneath the set may attain very high temperatures with the result that it is necessary to take precautions to prevent damage to the engine-generator set by heat radiated from the muffler. Furthermore, the muffler must be enclosed in some fashion to insure the safety of operating personnel.

Figure 5:
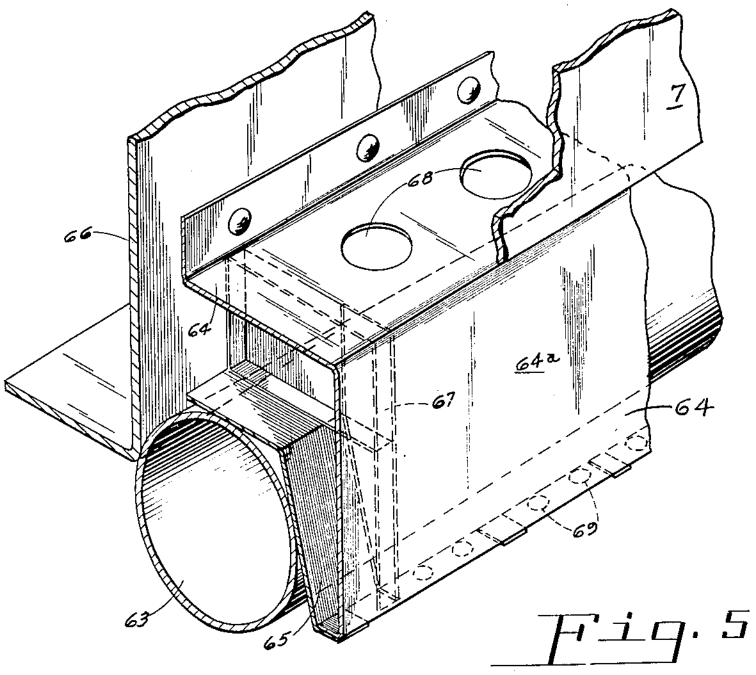
Fig. 5 is a partial sectional view in perspective showing the construction of the walls surrounding the muffler of the engine.

The unique construction employed for this purpose in the present invention is disclosed in Fig. 5. It will be noted in this figure that a double wall enclosure, including walls 64 and 65, is secured to channel 66 which is one of the structural members of the chassis 1. This enclosure is maintained in position by a plurality of ribs one of which is indicated at 67. The exterior side wall of body 7 is coplanar with lateral face 64*a* of wall 64 and cooperates therewith to form a continuous side wall as indicated in Fig. 1.

A plurality of air inlet holes 68 are formed in the top part of wall 64 to permit ingress of compressed cooling air from compartment 10 with which the holes are in intimate communication. After entering the enclosure through openings 68, the air flows to a plurality of outlet holes 69 from which the cooling air is vented to the atmosphere. In this way a continuous flow of cooling air is assured around the associated muffler and exterior face 64*a* is kept at a comparatively low temperature.

It will be noted in Fig. 2 that access doors 7*a* and 7*b* are hingedly secured to the side of the motor generator set. These doors may be opened to facilitate accessibility of the internal components. This is a particular advantage since for aircraft use it is necessary to construct the engine generator set very compactly to conserve space and weight. Accessibility in such a structure is a prime requisite.

From the foregoing description it will be apparent that an improved engine generator construction has been provided. It is to be noted that the construction permits the cooling of both the generator and engine compartments by a single stream of cooling air created by a transmission fan located midway between the compartments. Such a location of the fan not only establishes a flow of cooling air but also creates a slight pressure head in the engine compartment which may be used to advantage in establishing a flow of air through the batteries, exhaust pipe shields, and double wall enclosure housing the muffler. In addition, the pressure head within the engine compartment makes possible circulation of hot spent cooling air to the thermostatic control inlet louver located in the generator compartment. Furthermore, the pressure head aids in establishing a flow of air to the thermostatic mixing valve which regulates the temperature of the carburetor air supply.

Having described a preferred embodiment of our invention we claim:

1. An engine generator set comprising a body enclosure, an air cooled internal combustion engine within said enclosure, a plurality of electric generators within said enclosure spaced from said engine, a transmission within said enclosure to which are connected said engine and said generators, an air fan driven by said transmission, a partition within said enclosure adjacent said fan for dividing said enclosure into an engine compartment and a generator compartment, an air control louver in each of said compartments, a thermostatic regulating means for each of said louvers, said fan drawing air from said generator compartment for pressurizing said engine compartment, a conduit for conveying air from said engine compartment to said thermostatic regulating means of said louver in said generator compartment, an exhaust pipe for conveying combustion products from said engine to the exterior of said enclosure, a concentric pipe surrounding said exhaust pipe and communicating with the interior of said engine compartment and with the exterior of said enclosure, said engine compartment when pressurized by said fan constituting a plenum chamber from which air flows through said concentric pipe surrounding said exhaust pipe and through said conduit associated with said louver within said generator compartment.

2. Apparatus as defined in claim 1 and, in addition, batteries for starting said engine, and an air line for conveying scavenging air from said engine compartment to said batteries.

3. Apparatus as defined in claim 2 and, in addition, a thermostatic carburetor air regulating means disposed within said generator compartment, a conduit conveying air from said engine compartment to said carburetor air regulating means and a conduit for conveying temperature regulated air from said regulating means to said engine.

4. In an engine generator set a body enclosure, an air cooled internal combustion engine within said enclosure, a plurality of electric generators driven by said engine and spaced therefrom within said enclosure, a partition between said engine and said generators dividing said enclosure into engine and generator compartments, an air control louver in each of said compartments for controlling air flow through said body enclosure, a thermostatic regulating means for each of said louvers, a fan driven by said engine for drawing air from said generator compartment and pressurizing said engine compartment, and a conduit for conducting air from said engine compartment to a region of said generator compartment adjacent said thermostatic regulating means of said louver in said generator compartment, both of said thermostatic regulating means being responsive to the temperature within said engine compartment.

5. Apparatus as defined in claim 4 and, in addition, an exhaust pipe for conveying combustion products from said engine to the exterior of said enclosure, and a concentric pipe surrounding said exhaust pipe for conducting air from said engine compartment to the exterior of said enclosure.

6. In an engine-generator set surrounded by a unitary body an engine located within one end of the body, a plurality of generators located within the other end of the body, a transmission operatively connected to said engine and said generators through which said engine drives said generators, a rotary fan operatively associated with said transmission, a transverse bulkhead dividing the interior of the body in the plane of said transmission fan into engine and generator compartments, a louver in said generator compartment for controlling the ingress of ambient air, a louver in said engine compartment for controlling the egress of air therefrom, thermostatic means for controlling said engine compartment louver, thermostatic means for controlling said generator compartment louver, and means for conveying air from said engine compartment to said thermostatic means associated with said louver in said generator compartment.

7. In an engine-generator set a unitary body, an air cooled power source located within one end of said body, a generator located within the opposite end of said body, driving means connecting said engine to said generator, a transverse bulkhead dividing said body internally between said engine and said generator, means for establishing a flow of air from the generator end of said body to the engine end of said body, air flow control means admitting ambient air to the generator end of said body, air flow control means for controlling the egress of air from the engine end of said body, and thermostatic control means for regulating said first and second named air control means, said thermostatic control means being responsive to the temperature within the engine end of said body.

8. In an engine-generator set an enclosed body, an engine within said body, a generator driven by said engine and spaced therefrom within said body, a dividing wall within said body defining an engine compartment and a generator compartment, engine driven means for establishing air flow from said generator compartment to said engine compartment, air control means in said generator compartment for admitting ambient air thereto, and thermostatic regulating means for controlling said air control means, said regulating means being responsive to the temperature within said engine compartment.

9. A portable power plant comprising an enclosure, an air cooled internal combustion engine within said enclosure, a device driven by said engine and spaced therefrom within said enclosure, a partition within said enclosure separating said engine from said driven device, air pumping means for pumping air from the end of said enclosure surrounding said driven device to the end surrounding said engine, means for admitting ambient air to the end of said enclosure housing said driven device, means for controlling the egress of air from the engine end of said enclosure, thermostatic regulating means for controlling said air control means, said thermostatic regulating means being responsive to the temperature within the engine end of said enclosure, a carburetor connected to said engine, means for regulating said carburetor, and supplementary air control means for controlling the egress of air from the engine end of said enclosure, said last named air control means being adjusted simultaneously with said carburetor by said carburetor control means.

10. A portable power plant comprising an enclosure, an internal combustion engine within said enclosure, a device driven by said engine within said enclosure, means within said enclosure separating said engine from said driven device, air pumping means for pumping air from the end of said enclosure surrounding said driven device to the end surrounding said engine, air control means for admitting ambient air to the end of said enclosure housing said driven device, air control means for controlling the egress of air from the engine end of said enclosure, thermostatic regulating means for controlling said first and second named air control means, said thermostatic regulating means being responsive to the temperature within the engine end of said enclosure, a charge-forming means connected to said engine, means for regulating said charge-forming means, and supplementary air control means for controlling egress of air from the engine end of said enclosure, said supplementary air control means being adjusted simultaneously with said charge-forming means by said charge-forming regulating means.

11. Apparatus as defined in claim 10 and, in addition, a spring loaded linkage system between said charge-forming means and said supplementary air control means, and means for latching said supplementary air control means in closed position.

12. In a portable power plant, an enclosure defining a first and a second compartment within its interior, power producing and related power consuming means within said compartments respectively, means for establishing airflow from said first compartment to said second compartment, air control means permitting entry of air to said first compartment and egress of air from said second compartment, and thermostatic control means for regulating said air control means, said thermostatic control means being responsive to temperature conditions prevailing within one of said compartments.

13. In a portable power plant, a body enclosure, means within said enclosure defining a pair of compartments therein, a prime mover in one compartment, a device driven by said prime mover in the other compartment, air pumping means for establishing airflow from one compartment to the other compartment, air control means permitting entry of air to one compartment and egress of air from the other compartment and thermostatic control means for regulating said air control means, said thermostatic means being responsive to the temperature within one of the compartments.

14. In a generator set, an enclosed body, a prime mover within said body, a generator driven by said prime mover within said body, means within said body defining a prime mover compartment and a generator compartment, means for establishing airflow from said generator compartment to said prime mover compartment, means for controlling airflow from said generator compartment to said prime mover compartment, and thermostatic regulating means for controlling said air control means, said regulating means being responsive to the temperature within said prime mover compartment.

15. In an engine generator set an enclosed body, an engine within said body, a generator driven by said engine in said body, means within said body defining an engine compartment and a generator compartment, engine driven means for establishing airflow from said generator compartment to said engine compartment, air control means in said generator compartment for admitting ambient air thereto, air control means in said engine compartment for permitting egress of air therefrom, thermostatic regulating means for controlling said first and second named air control means, said thermostatic regulating means being responsive to the temperature within said engine compartment, and conduits communicating with said engine compartment for conveying air to points in the engine generator set remote from said engine compartment.

CLARENCE H. WIEGMAN.
DUDLEY S. KING.
AUGUST W. RICKENBACH.
FREDERIC G. ROHM.

REFERENCES CITED

The following references are of record in the file of this patent:

UNITED STATES PATENTS

| Number | Name | Date |
|---|---|---|
| 1,701,371 | Herr et al. | Feb. 5, 1929 |
| 1,873,379 | Frentzel, Jr. | Aug. 23, 1932 |
| 1,947,713 | Gumpper | Feb. 20, 1934 |
| 2,004,405 | Gumpper | June 11, 1935 |
| 2,086,036 | Juergens | July 6, 1937 |
| 2,150,143 | Adams | Mar. 14, 1939 |
| 2,177,687 | Bracken et al. | Oct. 31, 1939 |
| 2,209,363 | Sutherland | July 30, 1940 |
| 2,256,448 | Eddy | Sept. 6, 1941 |
| 2,355,208 | Devol et al. | Aug. 8, 1944 |
| 2,376,683 | Gill | May 22, 1945 |
| 2,482,924 | Melcher | Sept. 27, 1949 |
| 2,499,176 | Barrell | Feb. 28, 1950 |